(12) United States Patent
Nakamura et al.

(10) Patent No.: US 8,469,336 B2
(45) Date of Patent: Jun. 25, 2013

(54) VALVE ASSEMBLY (75) Inventors: Katsumi Nakamura, Toyota (JP); Shingo Iguchi, Toyota (JP)

(73) Assignee: Taiho Kogyo Co., Ltd., Toyota (JP)

( * ) Notice: Subject to any disclaimer, the term of this patent is extended or adjusted under 35 U.S.C. 154(b) by 447 days.

(21) Appl. No.: 12/734,116

(22) PCT Filed: Oct. 1, 2008

(86) PCT No.: PCT/JP2008/067840
§ 371 (c)(1),
(2), (4) Date: Apr. 12, 2010

(87) PCT Pub. No.: WO2009/051011
PCT Pub. Date: Apr. 23, 2009

(65) Prior Publication Data
US 2010/0206406 A1    Aug. 19, 2010

(30) Foreign Application Priority Data
Oct. 19, 2007    (JP) .................................. 2007-273196

(51) Int. Cl.
*F16K 31/44*    (2006.01)
*F16K 1/22*    (2006.01)

(52) U.S. Cl.
USPC .......................................... 251/214; 251/306

(58) Field of Classification Search
USPC ..................... 123/337, 568.11; 251/305, 306, 251/308, 214
See application file for complete search history.

(56) References Cited

U.S. PATENT DOCUMENTS

| | | | |
|---|---|---|---|
| 3,568,709 A * | 3/1971 | Fitting | 137/375 |
| 3,961,769 A * | 6/1976 | Crow et al. | 251/305 |
| 4,294,428 A | 10/1981 | Okada et al. | |
| 2005/0082507 A1 | 4/2005 | Tanaka et al. | |
| 2007/0131889 A1 * | 6/2007 | Unbehaun et al. | 251/305 |

FOREIGN PATENT DOCUMENTS

| | | |
|---|---|---|
| EP | 0 000 098 A1 | 12/1978 |
| GB | 1 508 283 A | 4/1978 |
| GB | 2 307 718 A | 6/1997 |
| GB | 2307718 * | 6/1997 |

(Continued)

OTHER PUBLICATIONS

"YC Industries Inc. Flexible Graphite Packing." YC Industries Inc. Flexible Graphite Packing. N.p., 2004. Web. Jun. 14, 2012. <http://www.ycindustries.com/flexiblegraphitepacking.htm>.*

(Continued)

*Primary Examiner* — John K Fristoe, Jr.
*Assistant Examiner* — Kevin E Lynn
(74) *Attorney, Agent, or Firm* — Oliff & Berridge, PLC (57) ABSTRACT

A valve assembly in which, even if a housing corrodes, application of a radially inward compression force to a heat-resistant filter can be suppressed. The valve assembly includes the housing having a gas path and a valve shaft hole, a valve having a valve shaft movably inserted in the valve shaft hole and also having a valve element connected to the valve shaft, and tubular heat-resistant filters installed between the inner peripheral surface of the valve shaft hole and the outer peripheral surface of the valve shaft and capturing dust in exhaust gas. The housing is made of cast iron. The valve assembly further has reinforcement collars installed between the inner peripheral surface of the valve shaft hole and the outer peripheral surfaces of the heat-resistant filters. The reinforcement collars have higher rigidity than the heat-resistant filters. At least the surfaces of the reinforcement collars are made of a high corrosion resistant material having higher corrosion resistance than the cast iron.

5 Claims, 10 Drawing Sheets

FOREIGN PATENT DOCUMENTS

| | | |
|---|---|---|
| JP | U-61-164443 | 10/1986 |
| JP | A-08-177853 | 7/1996 |
| JP | A-11-166428 | 6/1999 |
| JP | A-11-336616 | 12/1999 |
| JP | A-2005-120932 | 5/2005 |
| JP | A-2005-256803 | 9/2005 |
| JP | A-2005-315371 | 11/2005 |
| JP | A-2007-032301 | 2/2007 |
| JP | A-2007-040213 | 2/2007 |
| JP | A-2007-120386 | 5/2007 |
| JP | A-2007-120595 | 5/2007 |

OTHER PUBLICATIONS

Supplementary European Search Report in European Patent Application No. 08839061.2; dated Aug. 25, 2011.

International Search Report issued in International Application No. PCT/JP2008/067840 on Dec. 22, 2008 (with English-language translation).

International Preliminary Report on Patentability in International Application No. PCT/JP2008/067840; dated May 11, 2010.

May 15, 2012 Office Action issued in Japanese Patent Application No. 2007-273196 (with translation).

\* cited by examiner

VALVE ASSEMBLY

TECHNICAL FIELD

The present invention relates to a valve assembly used in an exhaust gas recirculation system (hereinafter referred to as "EGR system") for a vehicle or the like.

BACKGROUND ART

In an EGR system, an EGR passage is provided between an exhaust passage and an intake passage, and a part of exhaust gas is recirculated to the intake side via the EGR passage. For example, Patent Document 1 introduces a valve assembly for adjusting the flow amount of exhaust gas to be recirculated.

Figure 9:
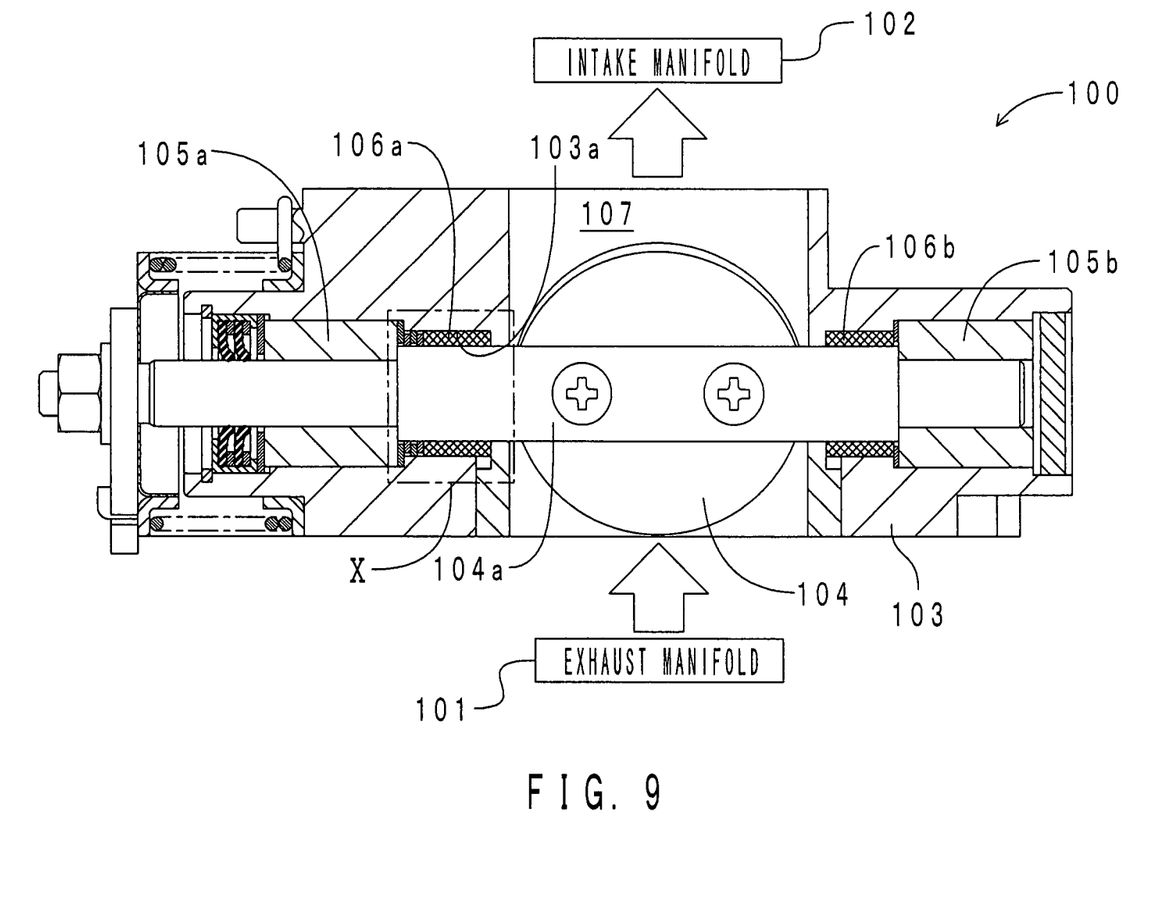
FIG. 9 is an axial sectional view of a valve assembly of the related art.

FIG. 9 shows an axial sectional view of a valve assembly described in Patent Document 1. As shown in FIG. 9, a valve assembly 100 is disposed between an exhaust manifold 101 and an intake manifold 102.

The valve assembly 100 includes a housing 103, a butterfly valve 104, bearings 105a and 105b, and wire filters 106a and 106b. The housing 103 is formed of stainless steel (SUS). A stem 104a of the butterfly valve 104 is inserted to a stem hole 103a of the housing 103.

Figure 10:
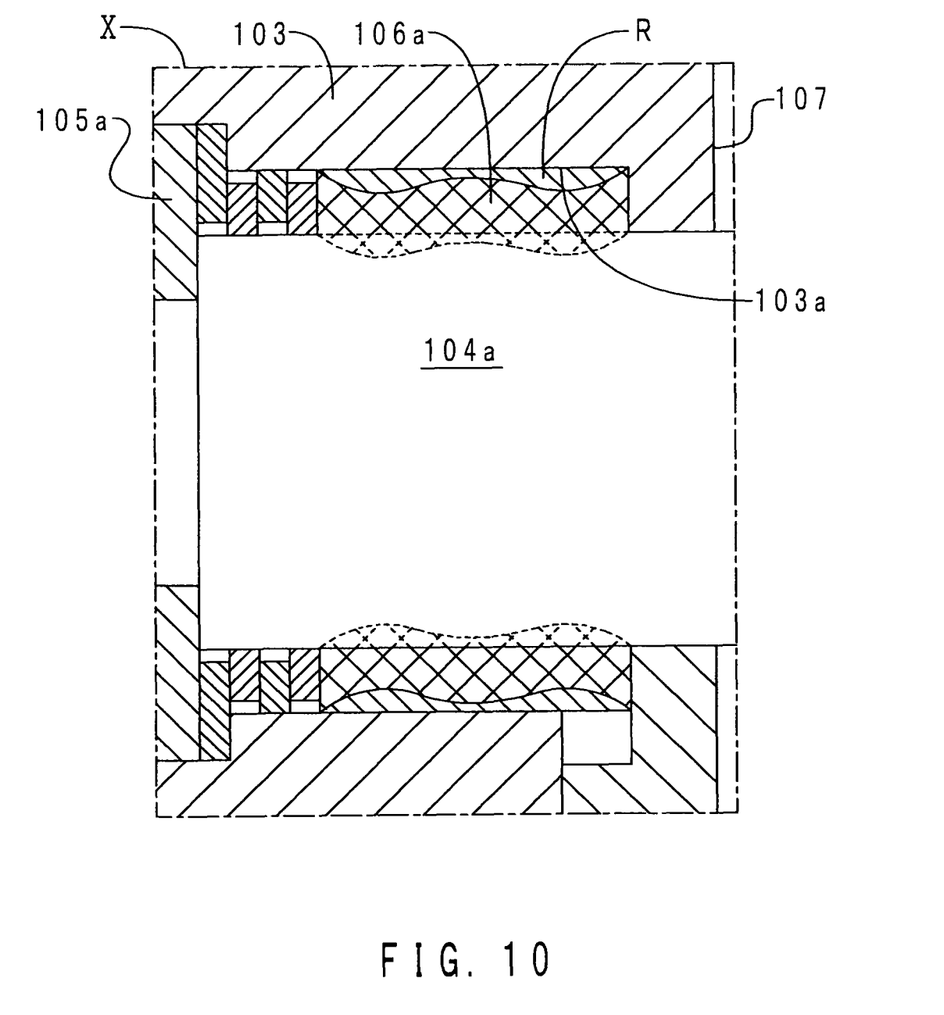
FIG. 10 is an enlarged view of the inside a frame X of FIG. 9.

FIG. 10 shows an enlarged view of the inside a frame X of FIG. 9. As shown in FIG. 10, the wire filter 106a is disposed between the inner circumferential surface of the stem hole 103a and the outer circumferential surface of the stem 104a. The wire filter 106a is formed of fibers of stainless steel (not shown) intertwined in mesh form. With the wire filter 106a, dust such as soot in the exhaust gas flowing through a gas passage 107 can be collected. Therefore, the bearing 105a can be protected from the dust.

[Patent Document 1] Japanese Patent Application Publication No. JP-A-2007-32301
[Patent Document 2] Japanese Patent Application Publication No. JP-A-2005-256803

DISCLOSURE OF THE INVENTION

Problem to be Solved by the Invention

In recent years, from the viewpoint of reducing the manufacturing cost of the valve assembly, changing the material of the housing 103 has been considered. Specifically, using inexpensive cast iron instead of the expensive stainless steel as the material of the housing 103 has been considered. For example, Patent Document 2 discloses a valve assembly having a housing formed of Ni-resist material (Ni austenite spheroidal graphite cast iron).

However, in the case of a diesel engine using the EGR system, sulfuric acid condensate including sulfur content in diesel is generated from the exhaust gas in the gas passage 107. The temperature of the exhaust gas is extremely high.

When the housing 103 formed of cast iron is arranged in such atmosphere, there is a possibility of a rust R being formed on the inner circumferential surface of the stem hole 103a as schematically shown in FIG. 10. In this case, the inner diameter of the stem hole 103a decreases by the thickness of the rust R. When the inner diameter of the stem hole 103a decreases, compression force toward the inside in the radial direction is applied to a member arranged on the inner diameter side of the stem hole 103a. Therefore, a member without rigidity to withstand the compression force, i.e., the wire filter 106a, is deformed. Specifically, in the case where the stem 104a is supposedly not inserted to the stem hole 103a, the inner diameter of the wire filter 106a decreases as schematically shown by a dotted line in FIG. 10.

In reality, the stem 104a is inserted to the stem hole 103a, and the inner circumferential surface of the wire filter 106a makes pressure contact with the outer circumferential surface of the stem 104a by a load corresponding to the decreased diameter. Thus, the rotational resistance of the stem 104a increases. In the case of a valve assembly including a poppet valve as in the case of Patent Document 2, the resistance of a stem moving in the axial direction in a stem hole increases.

It is also conceivable to perform plating on the entire housing formed of cast iron with a material having high corrosion resistance. However, in this case, the manufacturing cost of the valve assembly increases. As a consequence, the cost advantage of changing the material of the housing from stainless steel to cast iron is offset.

A valve assembly of the present invention has been completed in view of the problem described above. Thus, an object of the present invention is to provide a valve assembly, in which the compression force applied to a heat resistant filter toward the inside in the radial direction can be suppressed even in a case where a housing is corroded.

Means for Solving the Problem (1) In order to solve the problem described above, a valve assembly according to the present invention includes: a housing formed with a gas passage in which exhaust gas flows and a stem hole which is open to the gas passage and extends in a direction intersecting with an extending direction of the gas passage; a valve having a stem movably inserted to the stem hole and a valve body capable of adjusting a sectional area of the gas passage connected to the stem; and a cylinder-shaped heat resistant filter which is disposed between an inner circumferential surface of the stem hole and an outer circumferential surface of the stem and which collects dust in the exhaust gas, and the valve assembly is characterized in that the housing is formed of cast iron; a reinforcement collar is further provided between the inner circumferential surface of the stem hole and an outer circumferential surface of the heat resistant filter; the reinforcement collar has higher rigidity than the heat resistant filter; and at least a surface of the reinforcement collar is formed of a highly corrosion resistant material having higher corrosion resistance than cast iron.

The housing of the valve assembly of the present invention is formed of cast iron. Therefore, the manufacturing cost of the housing and consequently the valve assembly can be reduced. Between the inner circumferential surface of the stem hole and the outer circumferential surface of the heat resistant filter of the valve assembly of the present invention, the reinforcement collar is mounted. The reinforcement collar has higher rigidity than the heat resistant filter. Therefore, even in a case where the compression force is applied to the reinforcement collar from the inner circumferential surface of the stem hole toward the inside in the radial direction due to the corrosion of the housing, the rigidity of the reinforcement collar can resist the compression force. Thus, the application of the compression force to the heat resistant filter toward the inside in the radial direction can be suppressed. That is, it is possible to suppress the inner circumferential surface of the heat resistant filter from making excessive pressure contact with the outer circumferential surface of the stem due to the compression force resulting in an increase in the friction force between the two members.

At least the surface of the reinforcement collar is formed of highly corrosion resistant material having higher corrosion resistance than cast iron. Therefore, there is a small possibility of the compression force being applied to the heat resistant filter toward the inside in the radial direction due to the reinforcement collar corroding to decrease the inner diameter of the reinforcement collar. The application of the compression force to the heat resistant filter toward the inside in the radial direction can be suppressed in this regard as well.

In this manner, with the valve assembly of the present invention, the disadvantage of employing the housing formed of cast iron (i.e. the disadvantage that the housing is prone to corrode and therefore the compression force tends to be applied to the heat resistant filter toward the inside in the radial direction) can be reduced, while maintaining the advantage (i.e. advantage that the manufacturing cost can be reduced) of employing the housing formed of cast iron.

(2) In the configuration of (1) described above, it is preferable that the valve is a butterfly valve in which the stem moves in a rotational direction in the stem hole. With this configuration, there is a small possibility that the movement of the stem of the butterfly valve is restricted in the rotational direction by the heat resistant filter even if the housing is corroded. Therefore, it is possible to continuously control the valve body at a desired angle over a long period of time. In other words, the flow amount control of the exhaust gas can be performed with high accuracy over a long period of time.

(3) In the configuration of (1) or (2) described above, it is preferable that the heat resistant filter is a wire filter formed of metal fiber. The wire filter is formed of metal fibers being intertwined in mesh form. Therefore, the wire filter has low rigidity. Thus, the inner diameter of the wire filter easily decreases in a case where the compression force is applied from the inner circumferential surface of the stem hole toward the inside in the radial direction due to the corrosion of the housing. In this configuration, the reinforcement collar is provided between the inner circumferential surface of the stem hole and the outer circumferential surface of the wire filter. Therefore, a decrease in the inner diameter of the wire filter having low rigidity can be suppressed. Also, deformation of the wire filter causing unevenness in the size of the mesh can be suppressed.

(4) In the configuration of any one of (1) to (3) described above, it is preferable that the reinforcement collar is entirely formed of the highly corrosion resistant material. With this configuration, there is a small possibility of the reinforcement collar corroding. Therefore, it is possible to suppress the application of the compression force to the heat resistant filter toward the inside in the radial direction due to a decrease in the inner diameter of the reinforcement collar.

(5) In the configuration of any one of (1) to (4) described above, it is preferable that an edge of an opening portion of the stem hole with respect to the gas passage is formed of the highly corrosion resistant material. With this configuration, the edge of the opening portion, which is closest to the gas passage and tends to be exposed to the exhaust gas, is formed by the highly corrosion resistant material. Therefore, it is possible to suppress restriction of the movement of the stem, which is caused by the inner diameter of the opening portion decreasing due to corrosion.

(6) In the configuration of any one of (1) to (5) described above, it is preferable that the highly corrosion resistant material includes one or more selected from the group consisting of stainless steel, aluminum oxide, carbon, and nickel-phosphorus alloy. The materials given in this configuration all have high corrosion resistance. Therefore, with this configuration, at least the surface of the reinforcement collar can be reliably suppressed from corroding.

Effects of the Invention

With the present invention, a valve assembly in which the compression force applied to a heat resistant filter toward the inside in the radial direction can be suppressed even in a case where a housing is corroded.

DESCRIPTION OF THE REFERENCE SYMBOLS

1: valve assembly, 2: housing, 21: first sleeve, 22: second sleeve: 23: plug member, 200: gas passage, 201: stem hole, 202: boss portion, 203: lock protrusion portion, 30: butterfly valve, 300: stem, 300a: end portion, 300b: end portion, 300c: large diameter portion, 300d: small diameter portion, 300e: small diameter portion, 301: valve body, 302: screw, 31a: bearing, 31b: bearing, 32a: wire filter, 32b: wire filter, 320a: washer ring, 320b: washer ring, 33: labyrinth seal, 330: first small diameter ring, 331: large diameter ring, 332: second small diameter ring, 34: lip seal, 340: washer ring, 341: C-ring, 35a: reinforcement collar, 35b: reinforcement collar, 36a: reinforcement collar, 37a: reinforcement collar, 38a: reinforcement collar, 360a: cylinder portion, 361a: ring portion, 380a: collar body, 381a: coating layer, 82: lever, 83: nut, 84: guide, 85a: lever side spacer, 85b: housing side spacer, 86: return spring, 86a: one end, 86b: other end, 9: EGR system, 90: engine, 91: pipe, 92: motor control unit, 93: motor, 820: cutout, 900: combustion chamber, 901: intake manifold, 901a: intake passage, 902: exhaust manifold, 902a: exhaust passage, 910: EGR passage, R: rust.

BEST MODES FOR CARRYING OUT THE INVENTION

Hereinafter, embodiments of a valve assembly of the present invention will be described.

First Embodiment

[Arrangement of Valve Assembly]

Figure 1:
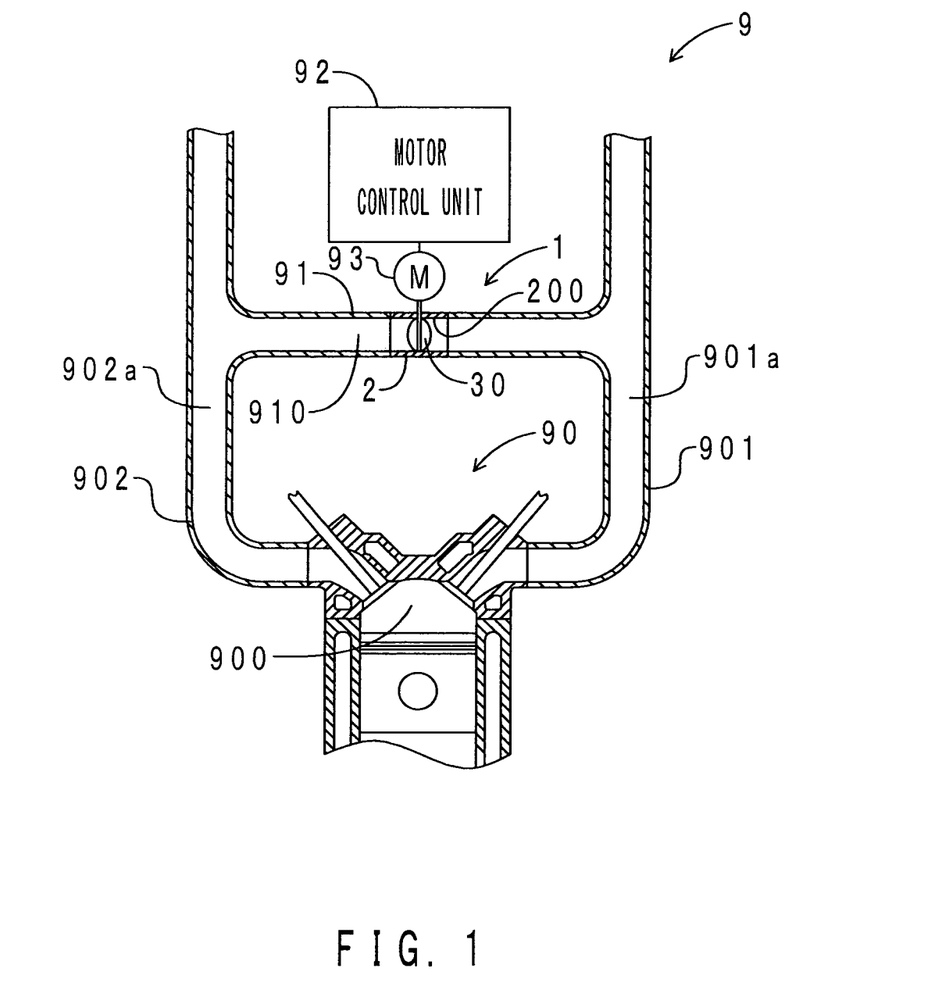
FIG. 1 is an arrangement view of a valve assembly of a first embodiment.

First, the arrangement of the valve assembly of this embodiment will be described. FIG. 1 shows an arrangement view of the valve assembly of this embodiment. As shown in FIG. 1, an EGR system 9 includes an engine 90, an EGR pipe 91, a motor control unit 92, and a valve assembly 1.

The engine 90 is a diesel engine, and includes a combustion chamber 900, an intake manifold 901, and an exhaust manifold 902. Inside the intake manifold 901, an intake passage 901a is formed. Inside the exhaust manifold 902, an exhaust passage 902a is formed. The intake passage 901a and the exhaust passage 902a are both connected to the combustion chamber 900.

The EGR pipe 91 bypasses the exhaust passage 902a and the intake passage 901a, and connects the exhaust manifold 902 and the intake manifold 901. Inside the EGR pipe 91, an EGR passage 910 is formed. The valve assembly 1 is mounted in the middle of the EGR pipe 91. The motor control unit 92 controls the amount of electricity for a motor 93 based on an instruction from an ECU (not shown). By swinging a butterfly valve 30, the sectional area of the EGR passage 910, specifically the sectional area of a gas passage 200, is adjusted.

[Configuration of Valve Assembly]

Figure 2:
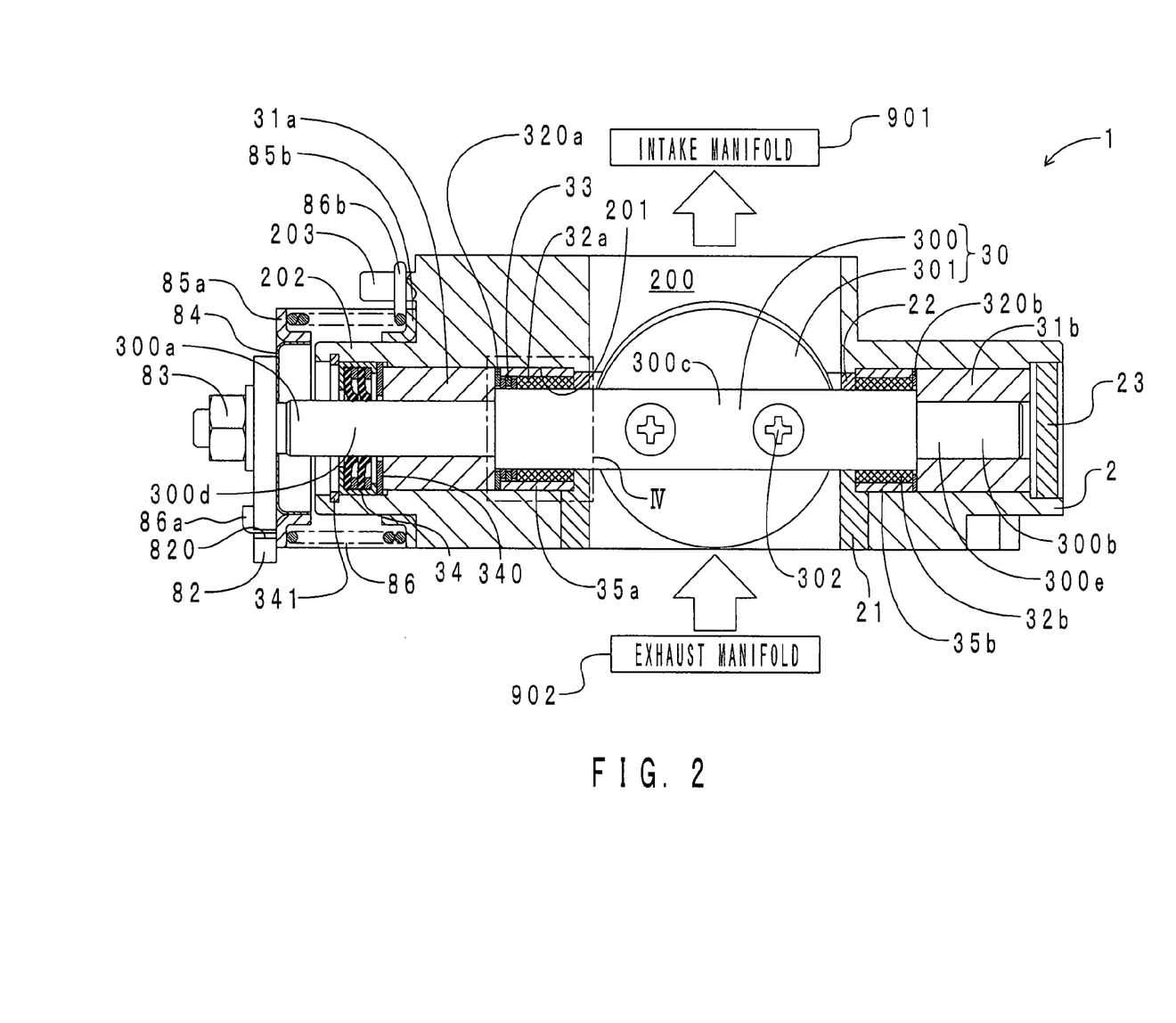
FIG. 2 is a stem direction sectional view of the valve assembly.

Next, the configuration of the valve assembly of this embodiment will be described. FIG. 2 shows a stem direction sectional view of the valve assembly of this embodiment. As shown in FIG. 2, the valve assembly 1 mainly includes a housing 2, a first sleeve 21, a second sleeve 22, the butterfly valve 30, bearings 31a and 31b, wire filters 32a and 32b, reinforcement collars 35a and 35b, a labyrinth seal 33, washer rings 320a and 320b, and a lip seal 34.

The housing 2 is formed of spheroidal graphite cast iron (FCD). The housing 2 is formed with a large diameter hole and a small diameter hole. The large diameter hole and the small diameter hole extend to intersect with each other at right angles.

The first sleeve 21 is formed of stainless steel, and has a short cylindrical shape. The second sleeve 22 is formed of stainless steel, and has a short cylindrical shape shorter than the first sleeve 21. The first sleeve 21 and the second sleeve 22 are aligned in the axial direction, and are engaged from one end of the large diameter hole of the housing 2 in the axial direction. The first sleeve 21 and the second sleeve 22 are arranged over approximately half of the large diameter hole in the axial direction. By the large diameter hole, the first sleeve 21, and the second sleeve 22, the gas passage 200 is formed. The inner space of the gas passage 200 has a cylindrical shape. The exhaust gas is introduced from the exhaust manifold 902 to the intake manifold 901 via the gas passage 200.

The first sleeve 21 and the second sleeve 22 are arranged to be displaced by a predetermined amount in the radial direction. Therefore, a step is formed at a joint of the first sleeve 21 and the second sleeve 22. The step is used as a valve seat of a valve body 301 described later.

A circular hole is formed at the joint of the first sleeve 21 and the second sleeve 22. The circular hole is continuous with the small diameter hole of the housing 2 in a straight line. By the circular hole and the small diameter hole, a stem hole 201 is formed. The inner space of the stem hole 201 has a cylindrical shape. The axial direction of the stem hole 201 and the axial direction of the gas passage 200 are approximately orthogonal. One end of the stem hole 201 in the axial direction is sealed by a plug member 23. Members to be arranged inside the stem hole 201 will be described later in detail.

The butterfly valve 30 includes a stem 300 and the valve body 301 both formed of stainless steel. The stem 300 has a stepped cylindrical shape. That is, the stem 300 includes a large diameter portion 300c and small diameter portions 300d and 300e. The large diameter portion 300c is arranged in the center portion of the stem 300 in the axial direction. The small diameter portions 300d and 300e are arranged on both sides of the large diameter portion 300c in the axial direction, respectively. The stem 300 is inserted to the stem hole 201. The stem 300 extends to cross the gas passage 200. An end portion 300a of the small diameter portion 300d of the stem 300 protrudes externally from a boss portion 202 of the housing 2. A plate-shaped lever 82 formed of stainless steel is fixed to the end portion 300a by a nut 83. The driving force is transmitted from the motor 93 of FIG. 1 described above to the lever 82.

On the inside (gas passage 200 side) of the lever 82 in the end portion 300a, a cup-shaped annular guide 84 formed of stainless steel is mounted. A ring-shaped lever side spacer 85a formed of phenol resin is externally engaged to the guide 84. Similarly, a ring-shaped housing side spacer 85b formed of phenol resin is externally engaged to the boss portion 202 of the housing 2. The lever side spacer 85a and the housing side spacer 85b are arranged to oppose each other in the axial direction of the stem 300. Between the lever side spacer 85a and the housing side spacer 85b, a return spring 86 formed of stainless steel is mounted. One end 86a of the return spring 86 is locked to a cutout 820 of the lever 82 via a cutout (not shown) of the lever side spacer 85a. Similarly, other end 86b of the return spring 86 is locked to a lock protrusion portion 203 that protrudes parallel to the boss portion 202 in the housing 2. The return spring 86 biases the butterfly valve 30 in the direction of closing. An end portion 300b of the small diameter portion 300e of the stem 300 is encapsulated inside the stem hole 201 by the plug member 23.

The valve body 301 has a disk shape. The valve body 301 is arranged in the gas passage 200. A diameter portion of the valve body 301 is fixed to the stem 300 by a screw 302. The driving force of the motor 93 of FIG. 1 described above is transmitted to the valve body 301 via the lever 82 and the stem 300. By the valve body 301 being driven in the rotational direction, the sectional area of the gas passage 200 can be adjusted.

Next, the members arranged inside the stem hole 201 will be described. First, the members arranged on the lever 82 side with respect to the gas passage 200 in the stem hole 201 will be described. On the lever 82 side with respect to the gas passage 200 in the stem hole 201, the wire filter 32a, the labyrinth seal 33, the washer ring 320a, a reinforcement collar 35a, the bearing 31a, a washer ring 340, the lip seal 34, and a C-ring 341 are arranged.

Figure 3:
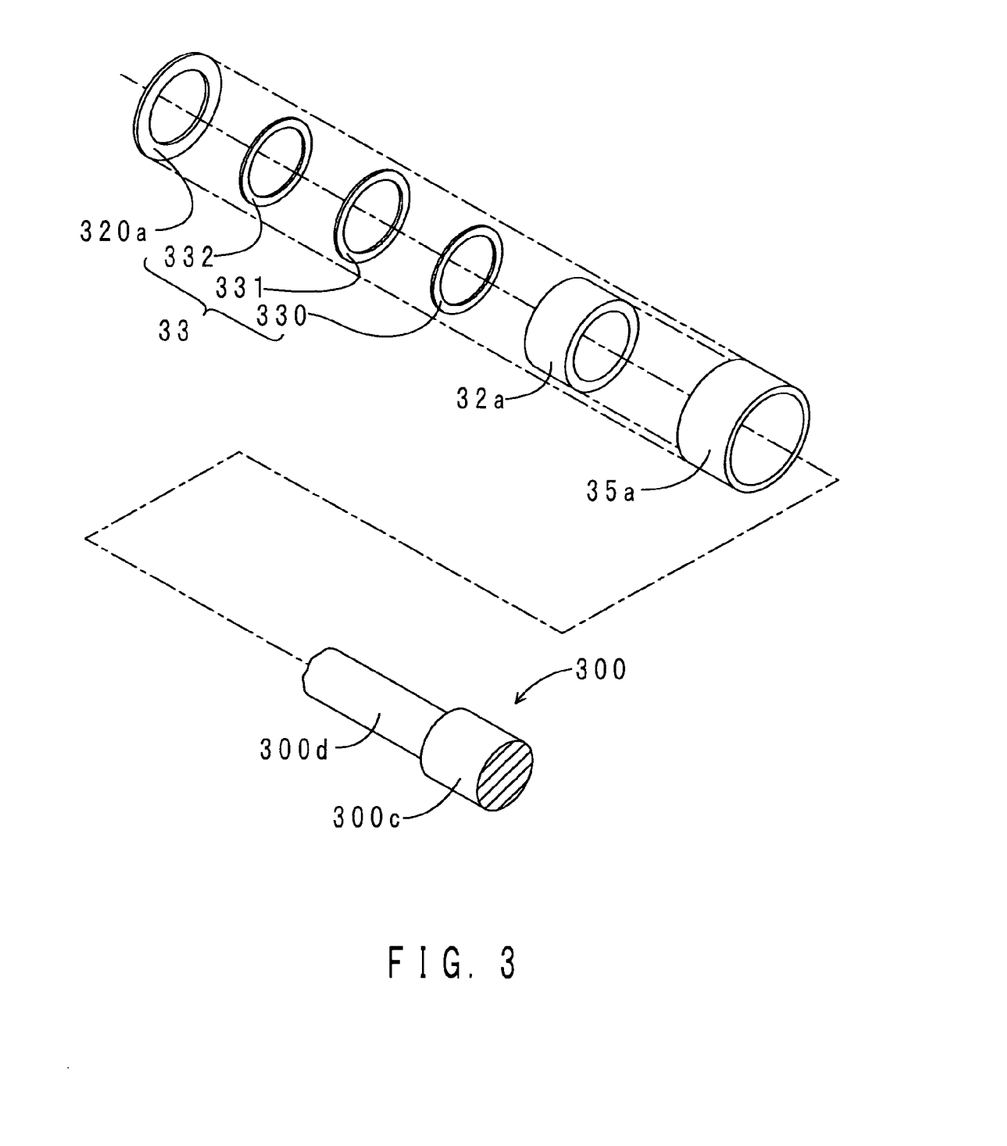
FIG. 3 is an exploded perspective view of a vicinity of a frame IV of FIG. 2.
Figure 4:
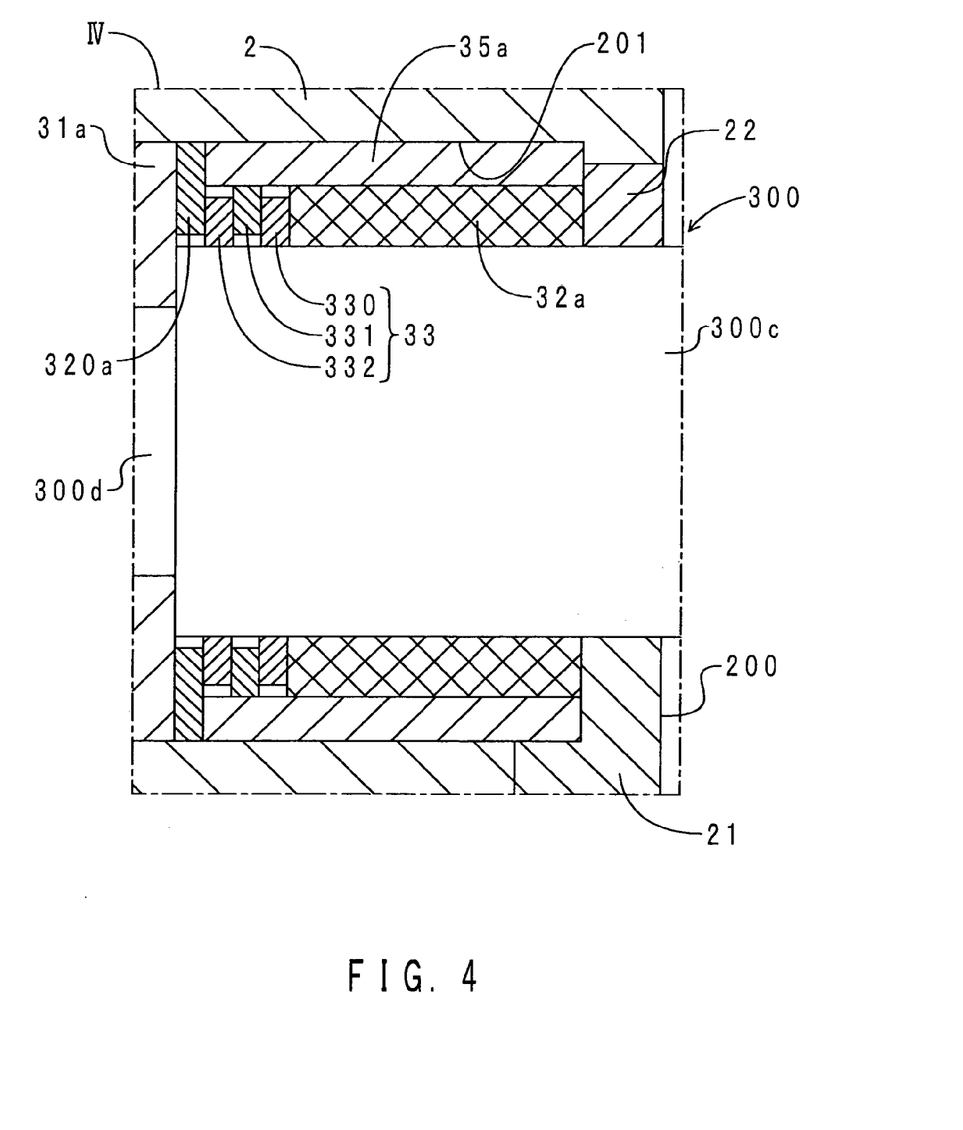
FIG. 4 is an enlarged view of the inside the frame IV of FIG. 2.

FIG. 3 shows an exploded perspective view of the vicinity of a frame IV of FIG. 2. FIG. 4 shows an enlarged view of the inside of the frame IV of FIG. 2. As shown in FIGS. 3 and 4, on the outer diameter side of the large diameter portion 300c of the stem 300, the wire filter 32a, the labyrinth seal 33, and the washer ring 320a are arranged in this order from the gas passage 200 side toward the lever 82 side. On the outer diameter side of the wire filter 32a and the labyrinth seal 33, the reinforcement collar 35a is arranged.

The wire filter 32a has a cylindrical shape. The wire filter 32a is formed of fibers of stainless steel (not shown) intertwined in mesh form. When the stem 300 rotates, the inner circumferential surface of the wire filter 32a makes sliding contact with the outer circumferential surface of the stem 300.

The labyrinth seal 33 includes a first small diameter ring 330, a large diameter ring 331, and a second small diameter ring 332, respectively formed of stainless steel. The first small diameter ring 330, the large diameter ring 331, and the second small diameter ring 332 are arranged in this order from the gas passage 200 side toward the lever 82 side. On the lever side of the second small diameter ring 332, the washer ring 320a formed of stainless steel is aligned. The outer circumferential surface of the washer ring 320a contacts the inner circumferential surface of the stem hole 201.

The reinforcement collar 35a is arranged on the outer diameter side of the wire filter 32a and the labyrinth seal 33.

The reinforcement collar 35a is formed of stainless steel, and has a cylindrical shape. The outer circumferential surface of the reinforcement collar 35a contacts the inner circumferential surface of the stem hole 201. The end surface of the reinforcement collar 35a on the lever 82 side in the axial direction contacts the washer ring 320a.

Between the outer circumferential surfaces of the first small diameter ring 330 as well as the second small diameter ring 332 and the inner circumferential surface of the reinforcement collar 35a, a predetermined clearance is formed. Also, between the inner circumferential surfaces of the large diameter ring 331 as well as the washer ring 320a and the outer circumferential surface of the stem 300, a predetermined clearance is formed. Thus, in the arrangement portion of the labyrinth seal 33 and the washer ring 320a, an exhaust gas route having a zigzag shape as a whole is formed.

Returning to FIG. 2, on the lever side of the washer ring 320a, the bearing 31a, the washer ring 340, the lip seal 34, and the C-ring 341 are arranged in this order from the gas passage 200 side toward the lever 82 side.

The bearing 31a is formed of carbon, and has a cylindrical shape. The bearing 31a rotatably supports the stem 300. The washer ring 340 separates the bearing 31a and the lip seal 34.

The lip seal 34 is a so-called double lip seal, and includes two lips arranged to be aligned in the axial direction. The two lips are both formed of polytetrafluoroethylene (PTFE), and have ring shapes. The inner circumferential edges of the two lips respectively curve toward the gas passage 200 side to make elastic contact with the outer circumferential surface of the stem 300.

Next, the members arranged on the plug member 23 side with respect to the gas passage 200 in the stem hole 201 will be described. On the plug member 23 side with respect to the gas passage 200 in the stem hole 201, the wire filter 32b, the washer ring 320b, and the bearing 31b are arranged in this order from the gas passage 200 side toward the plug member 23 side. On the outer diameter side of the wire filter 32b, the reinforcement collar 35b is arranged.

The configurations of the wire filter 32b, the washer ring 320b, the reinforcement collar 35b and the bearing 31b are similar to the configurations of the wire filter 32a, the washer ring 320a, the reinforcement collar 35a and the bearing 31a, respectively. Thus, descriptions of the configurations of the wire filter 32b, the washer ring 320b, the reinforcement collar 35b and the bearing 31b will be omitted here.

The reinforcement collar 35b is arranged on the outer diameter side of the wire filter 32b. The outer circumferential surface of the reinforcement collar 35b contacts the inner circumferential surface of the stem hole 201. The end surface of the reinforcement collar 35b on the plug member 23 side in the axial direction contacts the washer ring 320b.

The washer ring 320b separates the wire filter 32b as well as the reinforcement collar 35b and the bearing 31b. The washer ring 320b prevents the fibers of the wire filter 32b from making sliding contact with the end surface of the bearing 31b.

[Advantageous Effects of Valve Assembly]

Next, the advantageous effect of the valve assembly of this embodiment will be described. The housing 2 of the valve assembly 1 of this embodiment is formed of cast iron. Therefore, the manufacturing cost of the housing 2 and consequently the valve assembly 1 can be reduced.

The reinforcement collar 35a is disposed between the inner circumferential surface of the stem hole 201 and the outer circumferential surface of the wire filter 32a, and the reinforcement collar 35b is disposed between the inner circumferential surface of the stem hole 201 and the outer circumferential surface of the wire filter 32b, respectively, in the valve assembly 1 of this embodiment. The reinforcement collars 35a and 35b have higher rigidity than the wire filters 32a and 32b. Therefore, even in a case where the compression force is applied from the inner circumferential surface of the stem hole 201 toward the inside in the radial direction to the reinforcement collars 35a and 35b due to the corrosion of the housing 2, the rigidity of the reinforcement collars 35a and 35b can resist the compression force. Thus, the reduction of the inner diameters of the wire filters 32a and 32b due to the compression force can be suppressed. That is, the inner circumferential surfaces of the wire filters 32a and 32b making excessive pressure contact with the outer circumferential surface of the stem 300 can be suppressed. For this reason, the increase in friction force between the wire filter 32a and the stem 300 can be suppressed. Similarly, the increase in friction force between the wire filter 32b and the stem 300 can be suppressed.

The reinforcement collars 35a and 35b are both formed of stainless steel. Stainless steel has higher corrosion resistance than cast iron. Therefore, there is a small possibility that the reinforcement collars 35a and 35b corrode to decrease the inner diameters thereof such that the compression force is applied to the wire filters 32a and 32b toward the inside in the radial direction. A decrease in the inner diameters of the wire filters 32a and 32b due to the compression force can be suppressed in this regard as well.

With the valve assembly 1 of this embodiment, there is a small possibility that the movement of the stem 300 of the butterfly valve 30 in the rotational direction is restricted by the wire filters 32a and 32b even if the housing 2 is corroded. Therefore, it is possible to continuously control the valve body 301 at a desired angle over a long period of time. In other words, the flow amount control of the exhaust gas can be performed with high accuracy over a long period of time.

In the valve assembly 1 of this embodiment, the reinforcement collars 35a and 35b are disposed between the inner circumferential surface of the stem hole 201 and the outer circumferential surfaces of the wire filters 32a and 32b. Therefore, deformation of the wire filters 32a and 32b causing unevenness in the size of the mesh can be suppressed.

In the valve assembly 1 of this embodiment, the reinforcement collars 35a and 35b are entirely formed of stainless steel. Therefore, there is a small possibility of the reinforcement collars 35a and 35b being corroded.

In the valve assembly 1 of this embodiment, an opening portion of the stem hole 201 is arranged at the joint of the first sleeve 21 and the second sleeve 22. The first sleeve 21 and the second sleeve 22 are both formed of stainless steel having high corrosion resistance. Therefore, it is possible to suppress an increase in friction force, which is caused by the inner circumferential surface of opening portion of the stem hole 201 making excessive pressure contact with the outer circumferential surface of the stem 300 due to corrosion of the opening portion.

Second Embodiment

The difference of a valve assembly of this embodiment from the valve assembly of the first embodiment is that the reinforcement collar also serves as a washer ring. Also, the labyrinth seal is not provided. Thus, only the differences will be described.

Figure 5:
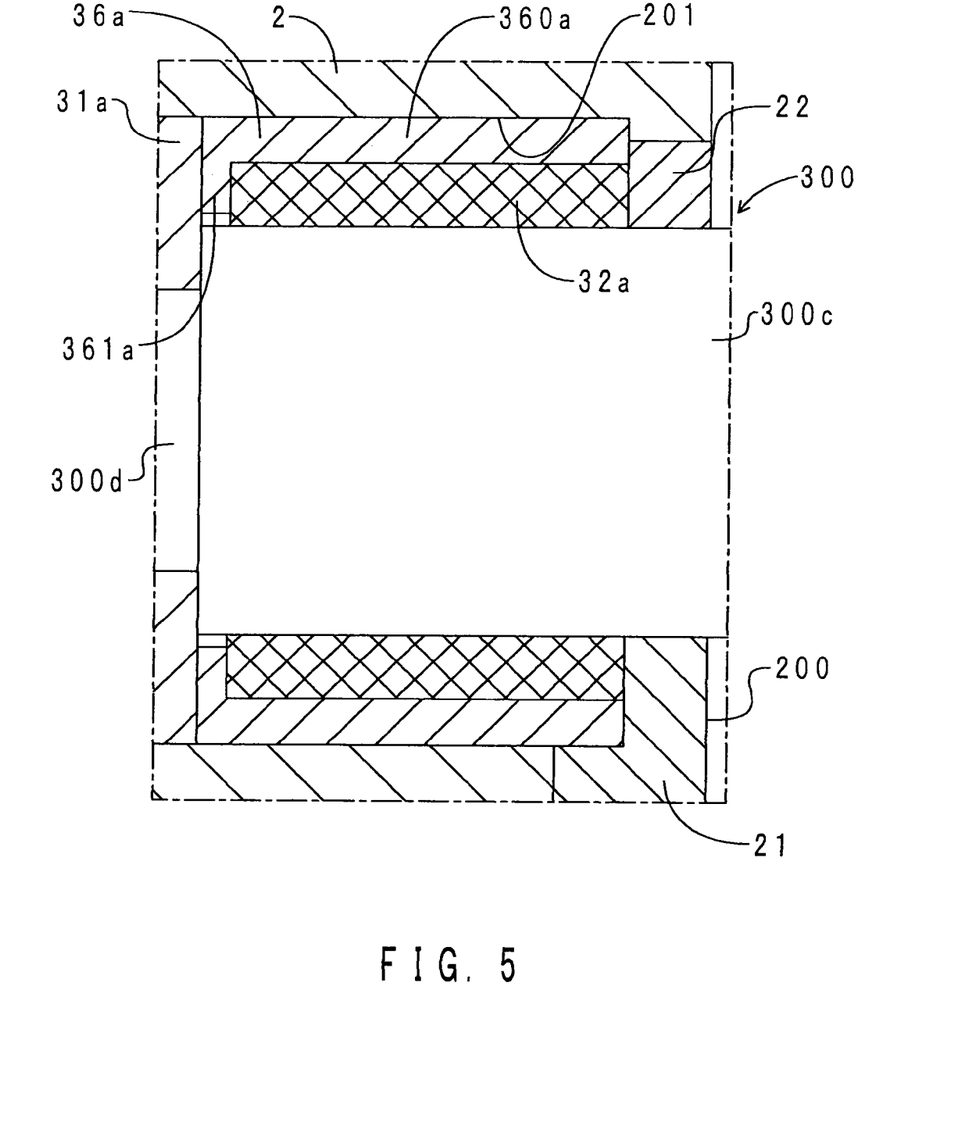
FIG. 5 is a partially enlarged view of a valve assembly of a second embodiment.

FIG. 5 shows a partially enlarged view of the valve assembly of this embodiment. A dashed-dotted frame of FIG. 5 corresponds to the frame IV of FIG. 4. Portions corresponding to those of FIG. 4 are denoted by the same reference symbols. As shown in FIG. 5, a reinforcement collar 36a is formed of stainless steel, and includes a cylinder portion 360a and a ring portion 361a. The cylinder portion 360a is disposed between the inner circumferential surface of the stem hole 201 and the outer circumferential surface of the wire filter 32a. The outer circumferential surface of the cylinder portion 360a contacts the inner circumferential surface of the stem hole 201. The ring portion 361a is formed integrally with an end portion of the cylinder portion 360a on the bearing 31a side. The outer circumferential surface of the ring portion 361a contacts the inner circumferential surface of the stem hole 201. The inner diameter of the ring portion 361a is smaller than the inner diameter of the cylinder portion 360a. Therefore, the ring portion 361a is continuous with the cylinder portion 360a as if a hole is formed in a bottom plate. The end surface of the wire filter 32a on the bearing 31a side contacts the ring portion 361a.

Note that the configuration and the arrangement on the lever 82 side (see FIG. 2 described above) with respect to the gas passage 200 described above is similar to the configuration and the arrangement on the plug member 23 side (see FIG. 2 described above) with respect to the gas passage 200 (in a symmetrical manner with respect to the gas passage 200). Thus, descriptions on the configuration and the arrangement on the plug member 23 side (see FIG. 2 described above) with respect to the gas passage 200 will be omitted.

The valve assembly of this embodiment has similar advantageous effects as the valve assembly of the first embodiment regarding portions having common configurations. The reinforcement collar 36a of the valve assembly of this embodiment includes the ring portion 361a. Therefore, it is not necessary to separately arrange the washer rings 320a and 320b (see FIG. 2 described above). Thus, the number of parts of the valve assembly can be reduced. Also, the assembling of the valve assembly becomes easy.

The valve assembly of this embodiment does not include the labyrinth seal 33 (see FIG. 2 described above). The number of parts can be reduced in this regard as well. Also, the assembling of the valve assembly becomes easy. Since the wire filter 32a can be extended up to the arrangement space of the labyrinth seal, the dust in the exhaust gas can be collected more easily. Thus, the bearing 31a can be kept cleaner. Alternatively, since the arrangement space of the labyrinth seal can be eliminated, the physical size of the valve assembly can correspondingly be reduced in the stem 300 direction.

Third Embodiment

The difference of a valve assembly of this embodiment from the valve assembly of the first embodiment is that the thickness of the reinforcement collar in the radial direction is thick. Also, the washer ring is not arranged. Thus, only the differences will be described.

Figure 6:
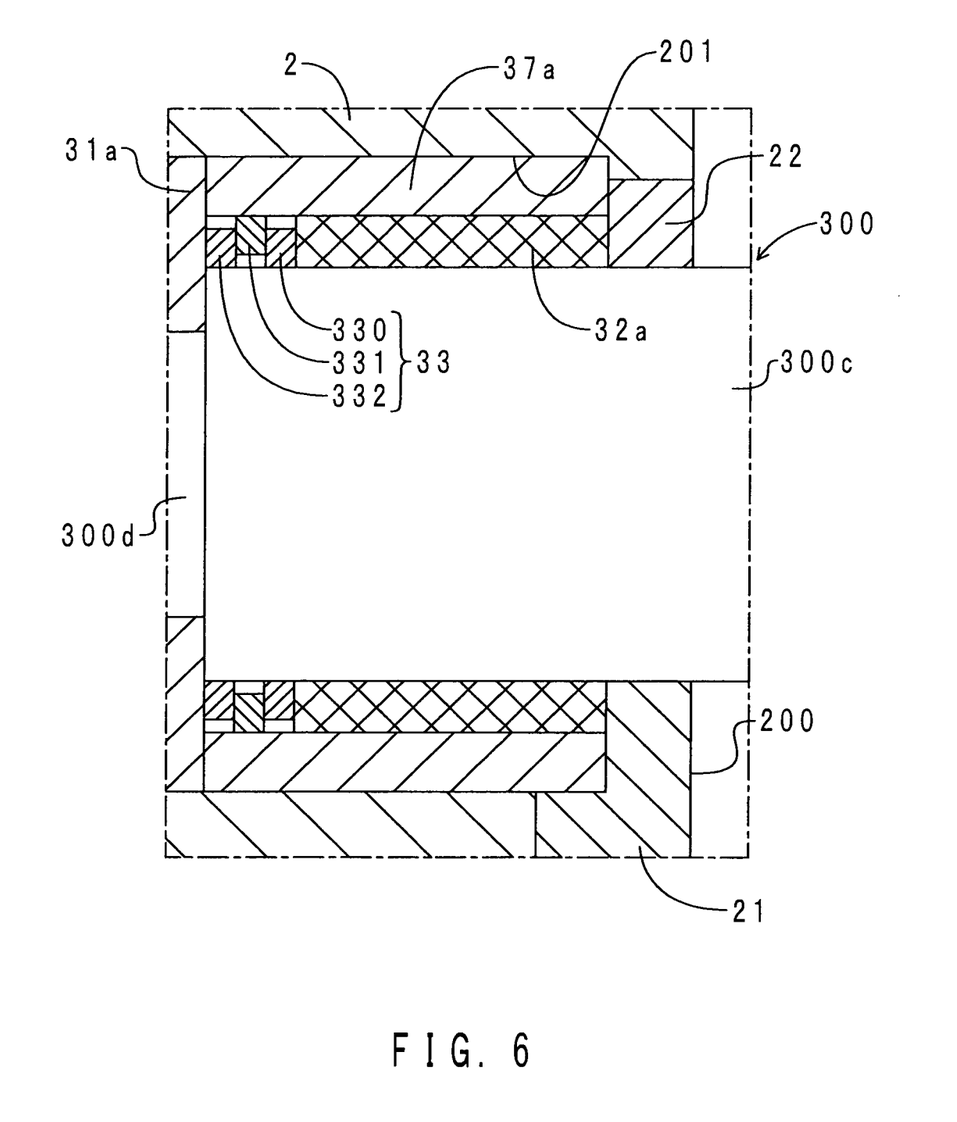
FIG. 6 is a partially enlarged view of a valve assembly of a third embodiment.

FIG. 6 shows a partially enlarged view of the valve assembly of this embodiment. A dashed-dotted frame of FIG. 6 corresponds to the frame IV of FIG. 4. Portions corresponding to those of FIG. 4 are denoted by the same reference symbols. As shown in FIG. 6, a reinforcement collar 37a is formed of carbon, and has a cylindrical shape. The thickness of the reinforcement collar 37a in the radial direction is set to be relatively thick. A washer ring is not arranged between the reinforcement collar 37a as well as the labyrinth seal 33 and the bearing 31a.

The configuration and the arrangement on the lever 82 side (see FIG. 2 described above) with respect to the gas passage 200 described above is similar to the configuration and the arrangement on the plug member 23 side (see FIG. 2 described above) with respect to the gas passage 200 (in a symmetrical manner with respect to the gas passage 200). Thus, descriptions on the configuration and the arrangement on the plug member 23 side (see FIG. 2 described above) with respect to the gas passage 200 will be omitted.

The valve assembly of this embodiment has similar advantageous effects as the valve assembly of the first embodiment regarding portions having common configurations. The reinforcement collar 37a of the valve assembly of this embodiment is thicker in the radial direction than the reinforcement collar 35a (see FIG. 4 described above) of the first embodiment. Therefore, compared to the reinforcement collar 35a, the reinforcement collar 37a has higher rigidity. Thus, application of the compression force to the wire filter 32a toward the inside in the radial direction can be further suppressed.

In the valve assembly of this embodiment, the washer rings 320a and 320b (see FIG. 2 described above) are not arranged. Thus, the number of parts of the valve assembly can be reduced. Also, the assembling of the valve assembly becomes easy.

Fourth Embodiment

The difference of a valve assembly of this embodiment from the valve assembly of the first embodiment is that the reinforcement collar includes a collar body and a coating layer. Thus, only the differences will be described.

Figure 7:
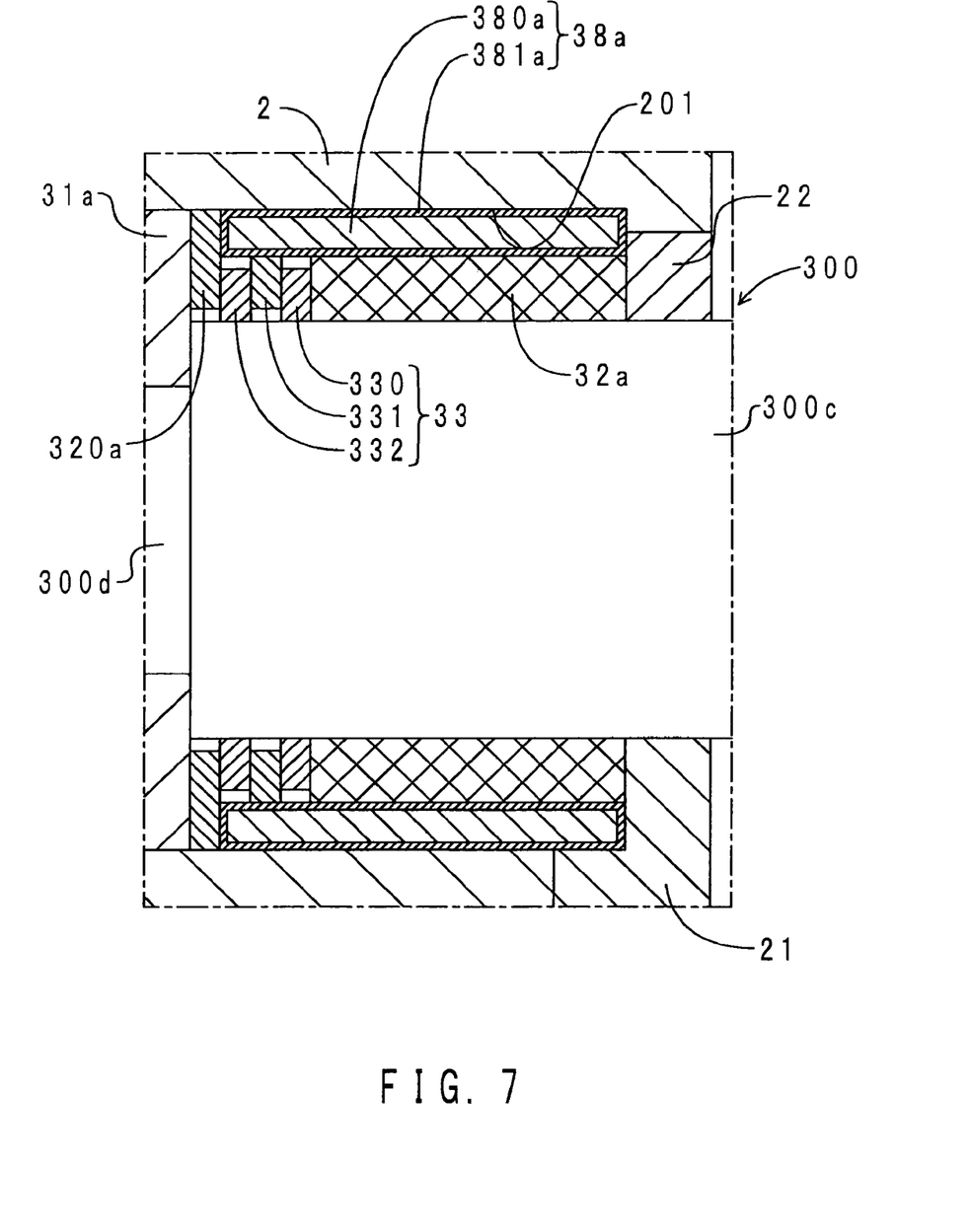
FIG. 7 is a partially enlarged view of a valve assembly of a fourth embodiment.

FIG. 7 shows a partially enlarged view of the valve assembly of this embodiment. A dashed-dotted frame of FIG. 7 corresponds to the frame IV of FIG. 4. Portions corresponding to those of FIG. 4 are denoted by the same reference symbols. As shown in FIG. 7, a reinforcement collar 38a includes a collar body 380a and a coating layer 381a. The collar body 380a is formed of aluminum alloy, and has a cylindrical shape. The coating layer 381a is formed of aluminum oxide, and is formed on the entire surface of the collar body 380a.

The configuration and the arrangement on the lever 82 side (see FIG. 2 described above) with respect to the gas passage 200 described above is similar to the configuration and the arrangement on the plug member 23 side (see FIG. 2 described above) with respect to the gas passage 200 (in a symmetrical manner with respect to the gas passage 200). Thus, descriptions on the configuration and the arrangement on the plug member 23 side (see FIG. 2 described above) with respect to the gas passage 200 will be omitted.

The valve assembly of this embodiment has similar advantageous effects as the valve assembly of the first embodiment regarding portions having common configurations. The reinforcement collar 38a of the valve assembly of this embodiment includes the collar body 380a and the coating layer 381a. Therefore, the coating layer 381a can provide corrosion resistance, and consequently, the material of the collar body 380a can be selected from a wider variety of choices.

Other Embodiments

The embodiments of the valve assembly of the present invention have been described above. However, embodiments are not particularly limited to the embodiments described above. Embodiments with various modifications and variations which can be carried out by those skilled in the art are also possible.

For example, the housing 2 is formed of the spheroidal graphite cast iron in the valve assembly of the embodiments described above, but may be formed of gray cast iron (FC). In the valve assembly of the embodiments described above, the wire filters 32a and 32b formed of the fibers of stainless steel intertwined in mesh form have been used as heat resistant filters, but the material and shape of the heat resistant filters are not particularly limited. For example, a heat resistant filter formed of carbon fiber or glass fiber may be used. Also, a heat resistant filter having a sponge structure may be used.

The bearings 31a and 31b are formed of carbon in the valve assembly of the embodiments described above, but may be formed of a copper material, for example. In the valve assembly of the fourth embodiment, the collar body 380a of the reinforcement collar 38a is formed of aluminum alloy, and the coating layer 381a is formed of aluminum oxide. However, the surface of the collar body 380a formed of cast iron may be subjected to a nickel-phosphorus plating process such that the plated layer serves as the coating layer 381a.

As the material of the reinforcement collar, a highly corrosion resistant material including one or more selected from the group consisting of tantalum, niobium, zirconium, titanium, molybdenum, chromium, tungsten, and nickel may be used, for example. The reason is that these materials all have high corrosion resistance.

In the embodiments described above, the valve assembly of the present invention has been embodied as the valve assembly 1 including the butterfly valve 30, but may be embodied as a valve assembly including a poppet valve.

EXAMPLE

Hereinafter, a corrosion test conducted for the valve assembly of the present invention will be described.

The valve assembly used as an example is the valve assembly of the first embodiment described above (see FIGS. 2 to 4 described above). That is, it is the valve assembly 1 including the housing 2 formed of spheroidal graphite cast iron and the reinforcement collar 35a formed of stainless steel.

A valve assembly used as a comparative example is the valve assembly of the related art (see FIGS. 9 and 10 described above), and the housing 103 is formed of spheroidal graphite cast iron. That is, it is the valve assembly 100 including the housing 103 formed of spheroidal graphite cast iron, and not including a reinforcement collar.

In the example and the comparative example, the inner diameters of the wire filters 32a and 106a are both 14.8 mm before the test. The outer diameters of the large diameter portions 300c of the stems 300 and 104a are 14.0 mm. That is, between the inner diameter of the wire filter 32a or 106a and the outer diameter of the stem 300 or 104a, a clearance of 0.4 (=(14.8−14.0)/2) mm is set on one side in the radial direction.

The valve assemblies of the example and the comparative example were respectively immersed in a sulfuric corrosion solution under a condition of an 80° C. temperature as a substitute of a condensate of exhaust gas of a diesel engine. The time-series variation of the inner diameters of the wire filters 32a and 106a were observed.

Figure 8:
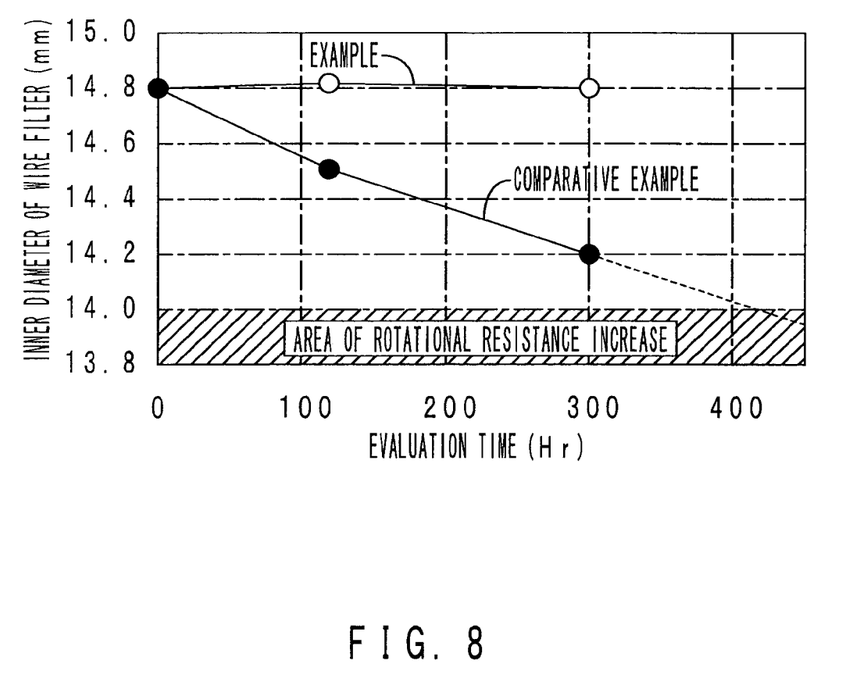
FIG. 8 is a graph showing a corrosion test result.

FIG. 8 shows a graph of the corrosion test result. The abscissa shows an evaluation time (hours), and the ordinate shows the inner diameters of the wire filters (mm), respectively. As time passes, corrosion progresses for both of the housings 2 and 103 of the example and the comparative example. As shown in FIG. 10 described above, in the case of the comparative example, the outer circumferential surface of the wire filter 106a having low rigidity is pressed against the inner circumferential surface of the stem hole 103a. Consequently, the inner diameter of the wire filter 106a decreases. Specifically, after 300 hours of evaluation time, the inner diameter of the wire filter 106a is decreased from the initial 14.8 mm to 14.2 mm. If the corrosion of the housing 103 continues to progress at this rate, the inner diameter of the wire filter 106a after 400 hours would be decreased to 14.0 mm as shown by a dotted line in FIG. 8. That is, the inner diameter of the wire filter 106a and the outer diameter of the stem 104a become the same. Therefore, the rotational resistance of the stem 104a increases.

On the other hand, in the case of the example, the inner diameter of the wire filter 32a does not decrease through time. That is, even if rust is formed in the housing 2, the rigidity of the reinforcement collar 35a outweighs the compression force applied from the inner circumferential surface of the stem hole 201 toward the inside in the radial direction. In addition, the reinforcement collar 35a does not corrode. Therefore, the rotational resistance of the stem 300 does not increase.

In this manner, although the housing 2 formed of cast iron is used in the valve assembly of the example, it can be found that the inner diameter of the wire filter 32a hardly decreases even if the housing 2 corrodes through time.

The invention claimed is:

1. A valve assembly comprising:
a housing formed with a gas passage in which exhaust gas flows and a stem hole which is open to the gas passage and extends in a direction intersecting with an extending direction of the gas passage;
a valve including a stem movably inserted to the stem hole and a valve body capable of adjusting a sectional area of the gas passage connected to the stem; and
a heat resistant filter which is disposed between an inner circumferential surface of the stem hole and an outer circumferential surface of the stem and which collects dust in the exhaust gas, wherein:
the heat resistant filter is cylinder-shaped;
the housing is formed of cast iron;
a reinforcement collar is further provided between the inner circumferential surface of the stem hole and an outer circumferential surface of the heat resistant filter;
the reinforcement collar has higher rigidity than the heat resistant filter;
at least a surface of the reinforcement collar is formed of a highly corrosion resistant material having higher corrosion resistance than cast iron;
the reinforcement collar is entirely housed inside the stem hole;
the highly corrosion resistant material includes one or more material selected from the group consisting of stainless steel, aluminum oxide, carbon, and nickel-phosphorus alloy; and
the valve is a butterfly valve in which the stem moves in a rotational direction in the stem hole.

2. The valve assembly according to claim 1, wherein the heat resistant filter is a wire filter formed of metal fiber.

3. The valve assembly according to claim 1, wherein the reinforcement collar is entirely formed of the highly corrosion resistant material.

4. The valve assembly according to claim 1, wherein an edge of an opening portion of the stem hole with respect to the gas passage is formed of the highly corrosion resistant material.

5. The valve assembly according to claim 1, wherein the heat resistant filter is entirely housed inside the reinforcement collar.

* * * * *